US006221151B1

(12) United States Patent
Campbell et al.

(10) Patent No.: US 6,221,151 B1
(45) Date of Patent: Apr. 24, 2001

(54) GYPSUM SET ACCELERATOR AND METHOD OF MAKING THE SAME

(75) Inventors: Frank H. Campbell, Matthews; Robert J. Piasecki, Charlotte, both of NC (US); Larry W. Kingston, North Tonawanda; Edward A. Burkard, East Amherst, both of NY (US)

(73) Assignee: National Gypsum Company, Charlotte, NC (US)

( * ) Notice: Subject to any disclaimer, the term of this patent is extended or adjusted under 35 U.S.C. 154(b) by 0 days.

(21) Appl. No.: 09/375,093

(22) Filed: Aug. 16, 1999

(51) Int. Cl.$^7$ .......................... C04B 11/00; C04B 22/14; C04B 24/10
(52) U.S. Cl. .......................... 106/778; 106/772; 106/779; 106/783
(58) Field of Search .................................. 106/772, 778, 106/779, 783

(56) References Cited

U.S. PATENT DOCUMENTS

| Re. 33,542 | 2/1991 | Musschoot | 51/7 |
|---|---|---|---|
| 3,797,758 | 3/1974 | Cherdron et al. | 241/29 |
| 3,870,538 | 3/1975 | Burkard et al. | 106/315 |
| 3,920,465 | 11/1975 | Burkard et al. | 106/114 |
| 3,947,285 | 3/1976 | Jones et al. | 106/111 |
| 4,002,484 | 1/1977 | Baudouin | 106/306 |
| 4,019,920 | 4/1977 | Burkard et al. | 106/114 |
| 4,059,456 | 11/1977 | DeRooy et al. | 106/114 |
| 4,076,935 | 2/1978 | Eichenseer et al. | 536/86 |
| 4,132,565 | 1/1979 | Willis | 106/315 |
| 4,169,747 | 10/1979 | DeRooy et al. | 156/39 |
| 4,298,394 | 11/1981 | Leeming et al. | 106/111 |
| 4,362,566 | 12/1982 | Hinterwaldner | 106/85 |
| 4,681,644 | 7/1987 | Dozsa | 156/39 |
| 5,180,532 | 1/1993 | Murakami et al. | 264/60 |
| 5,709,743 | 1/1998 | Leture et al. | 106/713 |
| 5,901,912 | 5/1999 | Voorberg | 241/65 |

OTHER PUBLICATIONS

K. Huseman et al., "Enhancing the Effectiveness of Dry Ultrafine Grinding and Classifying Processes by Addition of Surfactants," Wiesbaden, vol. 35, No. 8, pp. 393–403 (1994) (No month).

H.E. Rose et al., Vibration Mills and Vibration Milling, pp. 19–23 (Date unknown).

International Search Report in International (PCT) Application No. PCT/US00/19074, dated Nov. 13, 2000.

*Primary Examiner*—Anthony Green
(74) *Attorney, Agent, or Firm*—Marshall, O'Toole, Gerstein, Murray & Borun

(57) ABSTRACT

A composition for accelerating the setting reaction of an aqueous calcined gypsum slurry, and a method of making the same are disclosed. The composition includes a vibratory ball milled mixture of calcium sulfate dihydrate and a surfactant. The composition is prepared by subjecting the mixture to the high-frequency, low-impact grinding action of a vibratory ball mill. The resultant composition has a potency superior to that of conventional gypsum set accelerators.

27 Claims, No Drawings

GYPSUM SET ACCELERATOR AND METHOD OF MAKING THE SAME

BACKGROUND OF THE INVENTION

1. Field of the Invention

The present invention generally relates to the production of gypsum wallboard and, more specifically, the invention relates to a composition for accelerating the setting reaction of an aqueous calcined gypsum slurry, such as in the production of gypsum wallboard.

2. Brief Description of Related Technology

A common method of constructing walls and barriers includes the use of inorganic wallboard panels or sheets, such as gypsum wallboard, often referred to simply as "wallboard" or "drywall." Wallboard can be formulated for interior, exterior, and wet applications. The use of wallboard, as opposed to conventional boards made from wet plaster methods, is desirable because the installation of wallboard is ordinarily less costly and less cumbersome than installation of conventional plaster walls.

Generally, wallboard is produced by enclosing a core of an aqueous slurry of calcined gypsum and other materials between two large sheets of board cover paper. Various types of cover paper are known in the art. After the gypsum slurry has set (i.e., reacted with water present in the aqueous slurry) and dried, the formed sheet is cut into standard sizes. Methods for the production of gypsum wallboard generally are described, for example, by T. Michelsen, "Building Materials (Survey)," *Encyclopedia of Chemical Technology,* (1992 4th ed.), vol. 21, pp. 621–24, TP9.E685, the disclosure of which is hereby incorporated herein by reference.

Gypsum wallboard is manufactured utilizing commercial processes that are capable of operation under continuous, high-speed conditions. A conventional process for manufacturing the core composition of gypsum wallboard initially includes the premixing of dry ingredients in a high-speed mixing apparatus. The dry ingredients can include calcium sulfate hemihydrate (stucco), an accelerator, and a binder (e.g., starch). The dry ingredients are mixed together with a "wet" (aqueous) portion of the core composition in a pin mixer apparatus. The wet portion can include a first component, commonly referred to as a "paper pulp solution," that includes a mixture of water, paper pulp, and, optionally, one or more fluidity-increasing agents, and a set retarder. The paper pulp solution provides a major portion of the water that forms the gypsum slurry of the core composition. A second wet component can include a mixture of the aforementioned strengthening agent, foam, and other conventional additives, if desired. Together, the aforementioned dry and wet portions comprise an aqueous gypsum slurry that forms a wallboard core.

A major ingredient of the gypsum wallboard core is calcium sulfate hemihydrate, commonly referred to as "calcined gypsum," "stucco," or "plaster of Paris." Stucco has a number of desirable physical properties including, but not limited to, its fire resistance, thermal and hydrometric dimensional stability, compressive strength, and neutral pH. Typically, stucco is prepared by drying, grinding, and calcining natural gypsum rock (i.e., calcium sulfate dihydrate). The drying step of stucco manufacture includes passing crude gypsum rock through a rotary kiln to remove any free moisture present in the rock from rain or snow, for example. The dried rock then is passed through a roller mill (or impact mill types of pulverizers), wherein the rock is ground or comminuted to a desired fineness. The degree of comminution is determined by the ultimate use. The dried, fine-ground gypsum can be referred to as "land plaster" regardless of its intended use. The land plaster is used as feed to calcination processes for conversion to stucco.

The calcination (or dehydration) step in the manufacture of stucco is performed by heating the land plaster, and generally can be described by the following chemical equation which shows that heating calcium sulfate dihydrate yields calcium sulfate hemihydrate (stucco) and water vapor:

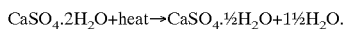
$$CaSO_4 \cdot 2H_2O + heat \rightarrow CaSO_4 \cdot \tfrac{1}{2}H_2O + 1\tfrac{1}{2}H_2O.$$

This calcination process step is performed in a "calciner," of which there are several types known by those of skill in the art.

Uncalcined calcium sulfate (i.e., land plaster) is the "stable" form of gypsum. However, calcined gypsum, or stucco, has the desirable property of being chemically reactive with water, and will "set" rather quickly when the two are mixed together. This setting reaction is actually a reversal of the above-described chemical reaction performed during the calcination step. The setting reaction proceeds according to the following chemical equation which shows that the calcium sulfate hemihydrate is rehydrated to its dihydrate state:

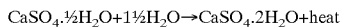
$$CaSO_4 \cdot \tfrac{1}{2}H_2O + 1\tfrac{1}{2}H_2O \rightarrow CaSO_4 \cdot 2H_2O + heat$$

The actual time required to complete the setting reaction generally depends upon the type of calciner and the type of gypsum rock that are used to produce the gypsum, and can be controlled within certain limits by the use of additives such as retarders, set accelerators, and/or stabilizers, for example. Generally, the rehydration time period can be in a range of about two minutes to about eight hours depending on the amount and quality of retarders, set accelerators, and/or stabilizers present.

After the aqueous gypsum slurry is prepared, the slurry and other desired ingredients are continuously deposited to form a wallboard core between two continuously-supplied moving sheets of board cover paper. More particularly, the two cover sheets comprise a pre-folded face paper and a backing paper. As the slurry is deposited onto the face paper, the backing paper is brought down atop the deposited core slurry and bonded to the prefolded edges of the face paper. The whole assembly then is sized for thickness utilizing a roller bar or forming plate. The deposited core is then allowed to set between the two cover sheets, thereby forming a board. The continuously-produced board is cut into panels of a desired length and then passed through a drying kiln where excess water is removed to form a strong, dry, and rigid building material.

The cover sheets used in the process typically are multi-ply paper manufactured from re-pulped newspapers and/or other grades of recycled papers. The face paper has an unsized inner ply which contacts the core slurry such that gypsum crystals can grow up to (or into) the inner ply—this, along with the starch, is the principal form of bonding between the core slurry and the cover sheet. The middle plies are sized and an outer ply is more heavily sized and treated to control absorption of paints and sealers. The backing paper is also a similarly constructed multi-ply sheet. Both cover sheets must have sufficient permeability to allow for water vapor to pass therethrough during the downstream board drying step(s).

Standardized sheets (or panels) of wallboard typically are cut and trimmed to dimensions of about four feet (about 1.2 meters) wide and about 8 feet to about 16 feet (about 2.4 meters to about 4.9 meters) in length (ASTM-C36). Sheets typically are available in thicknesses varying in a range of about ¼ inch to about one inch (about 0.6 centimeters to about 2.6 centimeters) in ⅛ inch increments. Standardized sheets of wallboard typically have a density in a range of about 1600 to about 1700 pounds (about 726 to about 772 kilograms) per thousand square feet (lbs/MSF) of one-half inch board.

The time at which the board may be cut, or in other words, the speed of the conveyor and the consequent rate of production of the gypsum board, is generally controlled by the setting time of the calcined gypsum slurry. Thus, conventional adjuvants to the calcined gypsum in the mixer generally include set time control agents, particularly accelerators. These and other additives such as pregenerated foam to control final density of the board, paper cover sheet bond promoting agents, fibrous reinforcements, consistency reducers and the like typically constitute less than 5%, and usually less than 2%, of the weight of the finished board core.

As noted above, a conventional adjuvant to the calcined gypsum slurry in the mixer is a set time control agent which can be used to decrease the setting time of the calcined gypsum slurry. Calcium sulfate hemihydrate mixed with an appropriate amount of water typically sets in about 25 minutes to a wallboard having a suitable hardness. In modem wallboard manufacturing plants, where a high production rate is necessary, a 25 minute setting period is too long and, therefore, it has been customary to reduce the setting time of the aqueous slurry to about five to about eight minutes by incorporating a gypsum set accelerator.

The most common form of accelerator used for setting a calcined gypsum slurry is calcium sulfate dihydrate. This material has been found to be an excellent accelerator, however, it is highly susceptible to becoming calcined, particularly in the presence of calcined gypsum which has been bagged while still warm or in the presence of moisture or heat generally. National Gypsum's Burkard et al. patents (U.S. Pat. Nos. 3,870,538; 3,920,465; and 4,019,920) each disclose a gypsum set accelerator comprising a mixture of calcium sulfate dihydrate and a water-soluble carbohydrate (e.g., starch). The presence of the water-soluble carbohydrate prevents the calcium sulfate dihydrate from undergoing an undesirable calcining reaction when exposed to the heat of a conventional comminuting ball mill. The accelerator is prepared by mixing the calcium sulfate dihydrate with the water-soluble carbohydrate and subjecting the mixture to the comminuting action of a compression mill, such as a rotary ball mill, a rod mill, or a tube mill, for a time sufficient to cause the two constituents to combine mechanically, and for a time sufficient to provide a final product having a particle surface area of about 10,000 square centimeters per gram ($cm^2/g$) as measured by Fisher Sub Sieve (FSS) techniques.

U.S. Pat. Nos. 3,947,285; 4,059,456; 4,132,565; and 4,298,394 can be considered cumulative to the Burkard et al. patents, discussed above, as they describe gypsum set accelerators comprising calcium sulfate dihydrate and water-soluble surfactants that are prepared by the comminuting action of a rotary ball mill to achieve a desired particle surface area. U.S. Pat. No. 3,797,758, teaches that a disintegration step is necessary to disintegrate agglomerates which form when a α-calcium sulfate hemihydrate (as opposed to a calcium sulfate dihydrate) is ground by the action of a vibrating ball mill. This disintegration step imparts undesired heat to the product.

U.S. Pat. Nos. 2,078,199 and 3,813,312 disclose that when calcium sulfate dihydrate mixed with a preservative, such as sugar or soluble dextrin, and then milled in a rotary ball mill dehydration of the accelerator is avoided even when subjected to various atmospheric conditions on storage. Additionally, U.S. Pat. No. 3,870,538 discloses that starch may be finely ground together with calcium sulfate dihydrate, which can serve as a preservative of the accelerator. However these materials, particularly sugar, are undesirably expensive.

In each of the foregoing cases of preparing an accelerator utilizing gypsum land plaster (i.e., calcium sulfate dihydrate), the comminuting action of a rotary ball mill to grind the land plaster into a finely particulate material undesirably generates high temperature heat, which must be removed during intermediate cooling stages of the process. Hence, a continuous process for manufacturing a gypsum set accelerator is not practically attainable. Furthermore, both of the high process temperatures and the lengthy cooling periods undesirably cause the accelerator to lose potency. This loss in potency leads to the use of greater amounts of the accelerator in order to achieve desired setting times.

Reference herein to the terms "set time" or "setting time," generally means the time between the event when the water first comes into contact with stucco or a mixture of the stucco and accelerator to form a gypsum slurry, and when calcium sulfate dihydrate crystals have sufficiently formed and have interlocked such that the slurry is not susceptible to flow. Those of skill in the art, however, are familiar with the metes and bounds of the terms.

In view of the foregoing, it would be desirable to provide a gypsum set accelerator having a potency superior to conventional gypsum set accelerators. Furthermore it would be desirable to provide a substantially continuous method of making a gypsum set accelerator having a potency superior to conventional gypsum set accelerators. Still further, it would be desirable to provide a gypsum wallboard prepared using a gypsum set accelerator having a potency superior to conventional gypsum set accelerators.

SUMMARY OF THE INVENTION

One aspect of the invention is a composition for accelerating the setting reaction of calcium sulfate hemihydrate and water. The composition includes a finely-ground product of a vibratory ball milling of a mixture of calcium sulfate dihydrate and a surfactant. The product preferably has a particle surface area as determined by laser optical measurement of at least about 3000 square centimeters per gram ($cm^2/g$), and a particle size of about 1 to about 15 micrometers ($\mu m$). The composition preferably has a potency that allows for a gypsum slurry set time of about 3.1 minutes or less as determined by a ¼-pound Gillmore Needle Test (C266), and about 5.5 minutes or less as determined by a 1-pound Gilhmore Needle Test (C266).

Another aspect of the invention is directed to a method of making a gypsum set accelerator. The method includes the step of at least substantially continuously blending calcium sulfate dihydrate and a surfactant to form a mixture, and conveying the mixture into a vibratory ball mill. The method includes the step of milling the mixture in the mill at a temperature of at less than 50° C. to achieve a finely-ground accelerator.

Advantages of the invention may become apparent to those skilled in the art from a review of the following detailed description, taken in conjunction with the examples, and the appended claims. It should be noted, however, that while the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE PREFERRED EMBODIMENTS

One embodiment of the invention is directed to a method of making a gypsum set accelerator. The method includes the step of at least substantially continuously blending calcium sulfate dihydrate and a surfactant to form a mixture, and conveying the mixture into a vibratory ball mill. The method includes the step of milling the mixture in the mill at a temperature at less than about 50° C. to achieve a finely-ground accelerator.

Another embodiment of the invention is directed to a composition for accelerating the setting reaction of calcium sulfate hemihydrate and water. The composition includes a finely-ground product of a vibratory ball milling of a mixture of calcium sulfate dihydrate and a surfactant. Preferably, the finely-ground product has a particle surface area as determined by laser optical measurement of at least about 3000 square centimeters per gram ($cm^2/g$), and a particle size of about 1 to about 15 microns or micrometers ($\mu m$).

Suitable vibratory ball mills include machines comprising a grinding chamber (or container) carried by a frame (e.g., steel coil isolation springs) resiliently mounted on a foundation, wherein the machine has a vibration generator adjustably carried by the container and capable of producing forces sufficient to cause material (e.g., a mixture of calcium sulfate dihydrate and a surfactant) within the container to move into contact with interior surfaces of the container. Contact with the interior surfaces of the container causes the material to break apart or fracture into finer grounded pieces. Repeated contact with the interior container surfaces and with surfaces of neighboring particles cause the grounded particles to break or fracture into even finer pieces.

Preferably, the interior surfaces of the grinding chamber are lined with a replaceable, abrasion-resistant steel liner, such as, for example, a carbon steel rolled-plate coated with chrome carbide. The vibration generator preferably is connected to the grinding chamber by alloy steel coils springs. The springs preferably are shot-peened and magnalo inspected. Preferably, the springs are designed with stress levels far below their normal fatigue stress range. These alloy steel coil springs preferably isolate the grinding chamber and vibration generator from the frame or support structure. Preferably the grinding chamber is charged with about 30 cubic feet ($ft^3$) to about 40 $ft^3$ (about 0.85 cubic meters ($m^3$) to about 1.13 $m^3$), and preferably about 34 $ft^3$ (about 0.96 $m^3$), of one-half inch (about 1.27 centimeters (cm)) diameter forged steel balls. These steel balls preferably account for about 30% to about 50% (and preferably about 40%) of the volume inside the grinding chamber. The machine and, more specifically, the vibration generator, preferably is powered by a 10 to 40 horsepower drive system comprised of belt-driven, counter-rotating, and counter-weighted drive shafts. Additional power can be obtained from energy stored in the coiled springs supporting the grinding chamber, if necessary.

A suitable vibratory ball mill for use in the present invention is disclosed in Musschoot U.S. Reissue Pat. No. Re 33,542, which is assigned to General Kinematics Corporation of Barrington, Ill., the disclosure of which is hereby incorporated herein by reference. A suitable vibratory ball mill is sold commercially under the name Vibra-Drum™ by General Kinematics Corporation. Other suitable vibratory ball mills can be obtained by those of skill in the vibrating machine arts from other manufacturers.

The vibratory ball mill used in the inventive process utilizes high-frequency, low-impact grinding to grind the calcium sulfate dihydrate (i.e., land plaster) such that the resulting surface area of the ground land plaster particles has an unexpectedly-high number of active sites which, during the use of the accelerator in a gypsum wallboard manufacturing process, behave as seeds to convert (rehydrate or re-grow) calcium sulfate hemihydrate (i.e., stucco) into calcium sulfate dihydrate.

Milling the calcium sulfate dihydrate in a vibratory ball mill results in an accelerator having an unexpectedly-high potency. It is believed that the high-frequency, low-impact grinding action of the vibratory ball mill fractures the calcium sulfate dihydrate particles along fault lines in the particles. The resultant particles have fresh crystalline surfaces, having an unexpectedly-high number of active sites. These active sites behave as "seeds" to convert (or re-grow) the stucco present in a gypsum slurry into the calcium sulfate dihydrate form. The higher the number of active sites present on the surfaces of the ground calcium sulfate dihydrate accelerator particles, the higher the potency of the accelerator, and the shorter the time period required for the gypsum slurry to set (set time).

The high-frequency, low-impact grinding of the vibratory ball mill provides a very efficient material size reduction because the increased number of impacts results in a faster and more efficient grinding action. Furthermore, reduced power consumption and the resulting reduced heat load are major benefits of the vibratory ball mill. Because the vibratory ball mill is non-rotating, a variety of options are available for cooling the mill such as, for example, by water cooling or air cooling. Another advantage of a vibratory ball mill is that, unlike conventional rotary ball mills, installation into existing gypsum wallboard manufacturing plants is easy because massive concrete foundations are not necessary to anchor the vibratory ball mill. Additionally, because a vibratory ball mill can be operated continuously to produce a sufficient supply of accelerator, storage silos for the accelerator, which were common with rotary ball mills, preferably are no longer necessary. The continuous operation of a vibratory ball mill is also advantageous because, instead of storing the accelerator for prolonged time periods (as in conventional wallboard forming processes), the accelerator can be incorporated into a continuous wallboard forming process. This, in turn, reduces the likelihood that the potency of the continuously-manufactured vibratory ball milled accelerator will degrade.

The method of manufacturing the accelerator provides the formed accelerator with unexpected properties (e.g., high potency). Suitable compositions for accelerators of this invention include calcium sulfate dihydrate in an amount of about 40 weight percent (wt. %) to about 80 wt. %, preferably about 50 wt. % to about 70 wt. %, based on the total weight of the composition. A surfactant preferably is present in the composition in an amount of about 20 wt. % to about 60%, more preferably about 30 wt. % to about 50 wt. %, based on the total weight of the composition.

The calcium sulfate dihydrate can be a high grade land plaster, e.g., 80 wt. % dihydrate or better. It can also be a low grade land plaster that includes anhydrites and variable amounts of impurities and inert materials. These impurities and inert materials are present, if at all, in amounts small enough such that they do not detrimentally influence the setting reaction. Preferably, the calcium sulfate dihydrate is substantially free from phosphoric acid. The calcium sulfate dihydrate, however, may contain considerable amounts of anhydrite, sand, or clay, and the like without significant impairment of the accelerating activity.

Use of a surfactant, such as starch, imparts a number of desirable process characteristics. For example, surfactants help in preventing the calcium sulfate dehydrate from agglomerating after it has been reduced to fine particles in the vibrating ball mill. In this regard, surfactants aid in the flowability of the accelerator within and through the vibratory ball mill and downstream conveying equipment. Furthermore, surfactants desirably reduce the likelihood, if not prevent, the calcium sulfate dihydrate from undergoing premature calcination, such as when exposed to heat. Still further, surfactants can act as a preservative of the calcium sulfate dihydrate.

Suitable surfactants for use in the invention include, but are not limited to, anionic, cationic, nonionic surfactants, and mixtures thereof. Suitable anionic surfactants include, but are not limited to, linear alkylate sulfonates such as sodium alkylbenzene sulfonates and sodium lauryl sulfates. Suitable cationic surfactants include, but are not limited to, starches, such as corn starch, acid-modified corn starch, grain starch, pearl starch (i.e., an unmodified raw starch), wheat starch, and acid-modified wheat starch. Suitable nonionic surfactants include, but are not limited to, ethoxylated nonylphenols. Generally, suitable starches include those which, when dispersed with a wet, set gypsum slurry core, will migrate to the core-to-paper cover sheet interface during drying and provide a strong bond at the interface between the core and paper cover sheet.

In accordance with the invention, a crushed-rock form or a synthetic form of calcium sulfate dihydrate and a surfactant, such as corn starch, are mixed together and the mixture is thereafter subjected to the action of a vibratory ball mill for a time sufficient to cause the two constituents to mechanically combine with one another and sufficient to produce an accelerator having a particle surface area of at least about 3000 cm$^2$/g as measured by laser optical measurement, and an average particle size of about 1 $\mu$m to about 15 $\mu$m. Preferably, the mixture is subjected to the action of the vibratory ball mill for a time period (referred to as the "dwell time") of about 5 minutes to about 90 minutes, depending upon the degree of fineness desired. Preferably, the dwell time is about 5 minutes to about 60 minutes, and more preferably about 10 to about 40 minutes. These dwell times can be obtained in grinding chambers having a length of about 4 feet (ft.) to about 16 ft. (about 1.2 meters (m) to about 4.9 m) and a diameter of about 1 ft. to about 4 ft. (about 0.3 m to about 1.2 m), depending upon the throughput. The maximum temperature inside the grinding chamber should be no greater than 50° C., preferably less than about 45° C., and more preferably less than about 40° C.

Finely ground particles exiting the grinding chamber or container of the vibrating ball mill preferably are passed into a classifier which serves to monitor the size of the particles exiting the container and recycle particles too large for use as an accelerator back into the container for further size reduction until an acceptable fine particle size is achieved. Generally, the fine particles can be passed into the classifier pneumatically, mechanically, or in an air stream where centrifugal product classification takes place in a primary classification chamber. Caution should be taken to ensure that the temperature within the classification chamber does not reach a level such that the potency of the gypsum set accelerator could be compromised (i.e., temperatures in excess of 50° C.).

Inside the classification chamber, oversized particles are thrown radially against walls of the chamber, away from the air flow, and travel downwards to a lower vortex where a secondary air is supplied. This vortex provides a cleaning or rinsing zone for any entrained fines to be recovered before finely-ground particles are discharged from the classifier. Fine particles of insufficient mass to be rejected by centrifilgal force are entrained in the airstream and pass through blades of the classifier to be transported to a secondary chamber via the rotary discharge. The fine particles of insufficient mass are separated from the airstream in a high efficiency cyclone, and can be recycled to the classifier (closed circuit) or vented to the atmosphere (open circuit). Particles of a suitable fineness and mass are passed from the classifier into downstream operations where they may be combined with a gypsum slurry and other gypsum slurry components in a downstream mixer. Suitable classifiers for use in the invention can be obtained from RSG Inc., of Sylacauga, Ala.

A finely-ground product of the vibratory ball milling process preferably has an average particle size of about 1 $\mu$m to about 15 $\mu$m, and more preferably about 3 $\mu$m to about 12 $\mu$m. Furthermore, a finely-ground product of the vibratory ball milling process preferably has a surface area, as determined by Microtrac laser optical measurement, of at least about 3000 cm$^2$/g, more preferably about 3000 cm$^2$/g to about 7500 cm$^2$/g, and even more preferably about 3500 cm$^2$/g to about 5000 cm$^2$/g. The finely-ground particles have an unexpectedly-high number of active sites desirable for accelerating the setting reaction of an aqueous calcined gypsum slurry.

The unexpectedly-high number of active sites present on the ground calcium sulfate dihydrate particles are not likely to degrade during the vibratory ball milling step because the particles are not likely to be exposed to high temperatures or prolonged cooling periods within the vibratory ball mill. Furthermore, the potency is not likely to be compromised because the residence (or dwell) time of the calcium sulfate dihydrate within the mill is much less than that of conventional ball mills.

With the high potency, smaller amounts of the vibratory ball milled accelerator are needed in the gypsum slurry to expedite the setting process, compared to conventional rotary ball milled accelerators, for example. Specifically, a gypsum slurry containing a conventional rotary ball milled accelerator typically takes about 3 minutes, 15 seconds to set according to a ¼-pound Gillmore Needle Test (ASTM C266), and about 5 minutes, 35 seconds to set according to a 1-pound Gillmore Needle Test. The same gypsum slurry containing similar amounts of an accelerator according to the invention, however, requires about 5.2% to about 23.1% less time to set according to the ¼-pound Gillmore Needle Test, and up to about 15% less time to set according to the 1-pound Gillmore Needle Test. The reduced setting times that can be achieved with the vibratory ball milled accelerator are beneficial because now more gypsum wallboard can be produced in a given time period. A Gillmore Needle Test is an industry standard test (ASTM C266) used to measure and compare the potency of gypsum set accelerators.

More specifically, use of a vibratory ball milled accelerator prepared in accordance with the invention enables one to achieve a gypsum slurry set time of preferably about 3.1 minutes or less, more preferably about 3 minutes or less, and even more preferably about 2.85 minutes or less as determined by a ¼-pound Gillmore Needle Test (ASTM C266). Additionally, use of a vibratory ball milled accelerator prepared in accordance with the invention enables one to achieve a gypsum slurry set time of preferably about 5.5 minutes or less, more preferably about 5.2 minutes or less, and even more preferably about 5 minutes or less as determined by a 1-pound Gillmore Needle Test (ASTM C266).

Conventional methods of preparing gypsum set accelerators utilize discontinuous ball milling techniques, such as, for example, rotary ball mills, to grind calcium sulfate dihydrate. These methods, however, generate high temperatures in the rotary ball milling step and, consequently, require prolonged time periods during which the calcium sulfate dihydrate and milling equipment must be cooled to avoid premature calcination of the calcium sulfate dihydrate. In contrast, the inventive process utilizes substantially continuous vibratory (or vibrating) ball mill techniques which do not impart high temperature heat to the accelerator and, therefore, do not require any intermediate cooling stages, to prepare gypsum set accelerators. Hence, the accelerator prepared according to the present invention exhibits a potency superior to that of conventional accelerators.

It has been found that the invention provides other significant improvements over conventional gypsum set accelerators produced using a rotary ball mill. Specifically, it has been found that a significant portion of the energy required to power the low-frequency, high-impact grinding of rotary ball mills is converted to heat. This heat, especially at temperatures of about 120° F. (about 50° C.) or higher, significantly contributes to the degradation of the accelerator as the calcium sulfate dihydrate is prematurely converted to calcium sulfate hemihydrate and, possibly, to an undesired deadburn calcium sulfate (i.e., $CaSO_4$). Steel balls present in rotary ball mills can absorb large amounts of the internal heat generated during the milling operation, however, these balls must eventually be cooled to avoid compromising the potency of the accelerator. Invariably, the rotary ball milling operation must be suspended temporarily to allow the balls to cool.

Thus, the high operating temperatures within a rotary ball mill result in short cycle times and long material residence times. The high operating temperatures coupled with the long material residence times in a rotary ball mill can lead to a decrease in potency of the accelerator. In fact, temperatures in excess of about 150° F. (about 65° C.) and residence times in excess of about one hour can lead to a complete loss of potency. Because land plaster is a heat sensitive material, starch is often added to combat the heat experienced in the rotary ball mill and to help prevent the onset of premature calcination. Heat generation and the addition of starch, however, limit the capacity of a rotary ball mill.

EXAMPLES

The following examples are provided to illustrate the invention but are not intended to limit the scope of the invention. Specifically, Examples 1 through 8 illustrate gypsum set accelerators prepared utilizing a vibratory ball mill according to the invention. In contrast, Comparative Example 9 illustrates a conventional gypsum set accelerator prepared utilizing a rotary ball mill according to conventional methods. Generally, the physical properties of (and results of tests performed on) the accelerators prepared in accordance with the invention (Examples 1–8) are superior to those of the conventional accelerator prepared by conventional rotary ball milling means (Comparative Example 9).

In each of the examples examples 1–8, and Comparative Example 9), the following land plaster and starch were used:

| Land Plaster (LP) Specifications | |
|---|---|
| Composition | Calcium Sulfate Dihydrate (32.6% CaO, 46.5% $SO_3$, and 20.9% $H_2O$) |
| Bulk Density (lbs/ft$^3$) | 50 to 80 |
| Particle Size (microns ($\mu$m)) | 28 to 30 |
| Temperature | Ambient to 170° F. |
| Heat Capacity (Btu/lb · °F.) | 0.259 |

| Starch Specifications | |
|---|---|
| Cereal Type | Corn Starch |
| Bulk Density (lbs/ft$^3$) | 35 to 40 |
| Fineness (US Sieve Series) | 2.0 wt. % (30 mesh) |
| | 15.0 wt. % (100 mesh) |
| Free Moisture | 13.0 wt. % |
| Particle Size (microns ($\mu$m)) | 28 to 30 |
| Temperature | Ambient |
| Heat Capacity (Btu/lb · °F.) | N/A |

Example 1

A volumetric screw feeder was used to feed a land plaster/starch blend (50/50 percent by weight) into a (closed circuit) vibratory ball mill having a diameter of two feet and a length of six feet. The mill, supplied by General Kinematics Corporation of Barrington, Ill., included an abrasion resistant steel liner and was charged with ¾ inch steel balls for a 40% grinding chamber load. A 20-horsepower motor was used to drive belt-driven, counter-rotating, and counter-weighted shafts.

The grinding action within the grinding chamber was fluid and intense. The residence time of the blend within the chamber was about 15 minutes and the temperature attained in the mill was only about 30° F. (about 16.6° C.) above ambient temperature (i.e., 25° C. or 77° F.). No significant ball coating or liner coating was observed.

The ground blend was pneumatically conveyed in an air stream from a low pressure blower to a classifier. Oversize material was returned via a recycle stream to the grinding chamber inlet. Samples were collected from the recycle stream by diverting the stream to a bucket. These samples were used to determine a mass flow rate of the recycle stream. Fines were separated from the air stream in a high-efficiency cyclone and collected in a drum. The drum weight was monitored by a scale.

The process air stream was cleaned in a dust collector before exiting through an exhaust fan to the atmosphere. Fines from the dust collector were collected, weighed, and sampled. These fines from the dust collector were mixed with the product collected in the drum at the same ratio in which they were produced. Screens in the dust collector did not appear to be plugged with product. Selected operating parameters of the foregoing equipment are provided below in Table I.

The accelerator produced according to Example 1 had an average particle size of about 8.4 $\mu$m and a surface area of 5702 cm$^2$/g as measured by Microtrac laser optical measurement. Potency as determined by Gilhnore Needle tests are provided in Table II, below.

Examples 2–6

Examples 2–6 are similar to Example 1, except that the operating conditions of various process equipment were changed slightly in each example. The equipment operating conditions are presented in Table I, below, and the physical property data and potency of the accelerators obtained in each of Examples 2–6 are reported in Table II, below.

Examples 7 and 8

Examples 7 and 8 are similar to Example 1, except that the land plaster/starch blend was a 70/30 (by weight) blend and the operating conditions of various process equipment were changed slightly in each example. An additional modification in Example 8 included the use of ½ inch ceramic balls instead of the ¾ inch steel balls used in each of Examples 1–7. The equipment operating conditions are presented in Table I, below, and the physical property data and potency of the accelerators obtained in each of Examples 7 and 8 are reported in Table II, below.

Comparative Example 9

A volumetric screw feeder was used to feed a land plaster/starch blend (50/50 by weight) at 100° F. into a low-speed rotary ball mill having a diameter of four feet and a length of eight feet. The mill included a 40-horsepower motor sufficient to power (rotate) the mill at 14 rotations per minute (RPM). The mill was designed to have a maximum operating temperature of about 150° F. (about 65.5° C.), and was charged with 7000 lbs. (3175 kilograms (kg)) of ½ inch diameter forged steel balls and 7000 lbs. (3175 kg) of ⅜ inch diameter forged steel balls.

For a typical 200 foot per minute (FPM) board plant, about 5 lbs/MSF or about 4 lbs/minute of the accelerator would be required. The rotary ball mill produced enough material in 34 minutes for two hours of plant operation. The internal heat generation was estimated to be about 1134 BTU/minute. The temperature rise within the mill was estimated to be about 18° during the 34 minute run time. The actual mill duty cycle for a 200 FPM plant was 28%, which allowed up to 86 minutes of cooling time for every 34 minutes of run time. A cooling air flow rate of 600 ft$^3$/minute (about 17 m$^3$/minute) removed heat at an average rate of about 300 BTU/minute. At this rate, the internal mill temperature approached its initial starting temperature after about 86 minutes. The temperature rise within the mill was estimated to be about 30° during a 55 minute run. Because the potency was estimated to degrade at temperatures of about 130° F. (about 54.4° C.) or higher, continuous rotary ball milling could be carried out for only about 55 minutes. Thereafter the mill and ground particles had to be cooled.

The physical property data and potency of the accelerator obtained in Comparative Examples 9 are reported in Table II, below.

TABLE I

| Example Number | LB/Starch Ratio | Classifier Rotor (RPM) | % Load | Dust Collector Fan (RPM) | (Amps) | Feeder (%) | Run Time (Mins.) | Reject Rate (lbs/hour) | Dust Collector (lbs/hour) | Product (lbs./hour) |
|---|---|---|---|---|---|---|---|---|---|---|
| 1 | 50/50 | 6000 | 21 | 2900 | 11.5 | 65 | 15 | 241 | 1.3 | 60 |
| 2 | 50/50 | 4000 | 21 | 2900 | 11 | 100 | 15 | 1224 | 4.4 | 168 |
| 3 | 50/50 | 3500 | 21 | 3100 | 13 | 100 | 15 | 1380 | 3.8 | 246 |
| 4 | 50/50 | 4000 | 21 | 3100 | 12.3 | 65 | 40 | 736 | 7.3 | 144 |
| 5 | 50/50 | 4000 | 21 | 3100 | 12.3 | 65 | 90 | 132 | 7 | 135 |
| 6 | 50/50 | 4000 | 21 | 3100 | 12.4 | 75 | 60 | 726 | 8.2 | 150 |
| 7 | 70/30 | 4000 | 17 | 3100 | 12.2 | 65 | 60 | 230 | 4.7 | 116 |
| 8 | 70/30 | 4000 | 15 | 3100 | 12.4 | 75 | 60 | 488 | 6.7 | 138 |

TABLE II

| Example Number | Gillmore Needle Sets (¼ lb.) (Mins.) | (1 lb.) (Mins.) | LP/Starch Ratio | Microtrac Particle Size Distribution Surface Area (cm$^2$/g) | Particle Size (Avg. μm) | Run Time (Mins.) | Comments |
|---|---|---|---|---|---|---|---|
| 1 | 2.67 | 4.83 | 50/50 | 5702 | 8.4 | 15 | ¾" Steel Balls |
| 2 | 2.83 | 5.17 | 50/50 | 5362 | 9.1 | 15 | ¾" Steel Balls |
| 3 | 3.08 | 5.58 | 50/50 | 4469 | 11.1 | 15 | ¾" Steel Balls |
| 4 | 2.83 | 5.08 | 50/50 | 4676 | 10.7 | 40 | ¾" Steel Balls |
| 5 | 2.67 | 4.83 | 50/5O | 4474 | 11.3 | 90 | ¾" Steel Balls |
| 6 | 2.83 | 5.17 | 50/50 | 4706 | 10.6 | 60 | ¾" Steel Balls |
| 7 | 2.50 | 4.75 | 70/30 | 5517 | 9.7 | 60 | ¾" Steel Balls |
| 8 | 3.08 | 5.50 | 70/30 | 5788 | 8.8 | 60 | ½" Ceramic Balls |
| 9 | 3.25 | 5.58 | 50/50 | 3944 | 14 | — | ¾" Steel Balls |

At rest, the 14,000 lbs. (6350 kg) of balls occupied space within the mill up to about two inches above the mill centerline to provide a maximum grinding efficiency. Due to the relatively slow rotational speed of the mill, only the top layer of steel balls contributed to the material grinding.

The foregoing description is given for clearness of understanding only, and no unnecessary limitations should be understood therefrom, as modifications within the scope of the invention may be apparent to those having ordinary skill in the art.

What is claimed is:

1. A composition for accelerating the setting reaction of calcium sulfate hemihydrate and water, the composition comprising a finely-ground product of a vibratory ball milling of a mixture comprising calcium sulfate dihydrate and a surfactant.

2. The composition of claim 1, wherein the product has a particle size of about 1 micron to about 15 microns.

3. The composition of claim 2, wherein the product has a particle size of about 3 microns to about 12 microns.

4. The composition of claim 1, wherein the product has a specific surface area as determined by laser optical measurement of at least about 3000 $cm^2/g$.

5. The composition of claim 4, wherein the product has a specific surface area as determined by laser optical measurement of about 3000 $cm^2/g$ to about 7500 $cm^2/g$.

6. The composition of claim 5, wherein the product has a specific surface area as determined by laser optical measurement of about 3500 $cm^2/g$ to about 5000 $cm^2/g$.

7. The composition of claim 1, wherein the mixture comprises about 40 weight percent (wt. %) to about 80 wt. % calcium sulfate dihydrate, and about 20 wt. % to about 60 wt. % surfactant, based on the total weight of the mixture.

8. The composition of claim 7, wherein the mixture comprises about 50 wt. % to about 70 wt. % calcium sulfate dihydrate, and about 30 wt. % to about 50 wt. % surfactant, based on the total weight of the mixture.

9. The composition of claim 1, wherein the surfactant comprises at least one of an anionic, a cationic, or a nonionic surfactant.

10. The composition of claim 9, wherein the surfactant comprises one or more of a corn starch, an acid-modified corn starch, a grain starch, a pearl starch, a wheat starch, or an acid-modified wheat starch.

11. A continuous method of making a gypsum set accelerator, the method comprising the steps of:
    (a) substantially continuously blending calcium sulfate dihydrate and a surfactant to form a mixture;
    (b) conveying the mixture of step (a) into a vibratory ball mill; and,
    (c) milling the mixture in the mill at a temperature of less than about 50° C. to achieve a finely-ground gypsum set accelerator.

12. The method of claim 11, wherein a residence time of the mixture within the mill is about 5 to about 90 minutes.

13. The method of claim 12, wherein the residence time is about 5 to about 60 minutes.

14. The method of claim 13, wherein the residence time is about 5 to about 40 minutes.

15. The method of claim 11, wherein the temperature is less than about 45° C.

16. The method of claim 15, wherein the temperature is less than about 40° C.

17. The method of claim 11, wherein the milling step (c) is carried out utilizing high-frequency, low-impact grinding.

18. The method of claim 11, wherein the mixture comprises about 50 wt. % to about 70 wt. % calcium sulfate dihydrate, and about 30 wt. % to about 50 wt. % surfactant, based on the total weight of the mixture.

19. The method of claim 11, wherein the surfactant comprises at least one of an anionic, a cationic, or a nonionic surfactant.

20. The method of claim 19, wherein the surfactant comprises one or more of a corn starch, an acid-modified corn starch, a grain starch, a pearl starch, a wheat starch, and an acid-modified wheat starch.

21. A gypsum set accelerator made by a method comprising the steps of:
    (a) substantially continuously blending calcium sulfate dihydrate and a surfactant to form a mixture;
    (b) conveying the mixture of step (a) into a vibratory ball mill; and,
    (c) milling the mixture in the mill at a temperature of less than about 50° C. to achieve a finely-ground gypsum set accelerator.

22. A composition for accelerating the setting reaction of calcium sulfate hemihydrate and water, the composition comprising a ground product of a vibratory ball milling of a mixture comprising calcium sulfate dihydrate and a surfactant, the composition having a potency allowing a gypsum slurry set time of about 3.1 minutes or less as determined by a ¼-pound Gillmore Needle Test (ASTM C266).

23. The composition of claim 22 having a potency allowing a gypsum slurry set time of about 3 minutes or less as determined by a ¼-pound Gillmore Needle Test (ASTM C266).

24. The composition of claim 23 having a potency allowing a gypsum slurry set time of about 2.85 minutes or less as determined by a ¼-pound Gillmore Needle Test (ASTM C266).

25. A composition for accelerating the setting reaction of calcium sulfate hemihydrate and water, the composition comprising a mixture comprising calcium sulfate dihydrate and a surfactant, the composition having a potency allowing a gypsum slurry set time of about 5.5 minutes or less as determined by a 1-pound Gillmore Needle Test (ASTM C266).

26. The composition of claim 25 having a potency allowing a gypsum slurry set time of about 5.2 minutes or less as determined by a 1-pound Gillmore Needle Test (ASTM C266).

27. The composition of claim 26 having a potency allowing a gypsum slurry set time of about 5 minutes or less as determined by a 1-pound Gillmore Needle Test (ASTM C266).

* * * * *